United States Patent [19]

Peterson et al.

[11] Patent Number: 5,445,662

[45] Date of Patent: Aug. 29, 1995

[54] GLASS CONTAINER FORMING MACHINE WITH A CONTROLLER FOR CONTROLLING CONTROLLERS

[75] Inventors: George T. Peterson, Bristol; Timothy J. Liska, West Simsbury, both of Conn.; Can Nguyen, Longmeadow, Mass.; John W. McDevitt, Vernon, Conn.; Kevin N. O'Connor, Belchertown, Mass.; George J. Collins, Somers, Conn.

[73] Assignee: Emhart Glass Machinery Investments Inc., Wilmington, Del.

[21] Appl. No.: 164,677

[22] Filed: Dec. 9, 1993

Related U.S. Application Data

[63] Continuation of Ser. No. 992,717, Dec. 18, 1992, abandoned.

[51] Int. Cl.⁶ .............................................. C03B 9/40
[52] U.S. Cl. .................................... 65/158; 65/163; 65/DIG. 13; 364/473; 364/476
[58] Field of Search .................. 364/473, 476; 65/158, 65/DIG. 13, 163, 160, 164

[56] References Cited

U.S. PATENT DOCUMENTS

| | | |
|---|---|---|
| 3,905,793 | 9/1975 | Croughwell ........................... 65/163 |
| 4,108,623 | 8/1978 | Cardenas-Franco ................. 65/163 |
| 4,141,711 | 2/1979 | Zabor .................................... 364/473 |
| 4,152,134 | 5/1979 | Dowling ............................... 65/158 |
| 4,338,115 | 7/1982 | Farkas .................................. 65/158 |
| 4,364,764 | 12/1982 | Farkas ................................ 364/473 |
| 4,375,669 | 3/1983 | Johnson ............................. 364/473 |
| 4,459,146 | 7/1984 | Farkas ................................ 364/473 |
| 4,529,429 | 11/1985 | Wood ................................. 364/473 |
| 4,615,723 | 10/1986 | Rodriguez-Fernandez ........ 65/158 |
| 4,641,269 | 2/1987 | Japenga .............................. 364/473 |
| 4,685,947 | 8/1987 | Liska .................................. 65/158 |
| 4,705,552 | 11/1987 | Liska ................................ 65/158 |

*Primary Examiner*—W. Gary Jones
*Assistant Examiner*—John Hoffmann
*Attorney, Agent, or Firm*—Spencer T. Smith

[57] ABSTRACT

A cyclical machine for forming at least one glass container each machine cycle comprising a plurality of controllers for controlling regulators and/or profiled motion actuators, at least one displaceable structure, controllers controlling the operation of all the other controllers, each of the controllers including repetitive sequencer and operable in any of a plurality of states, the one controller determines the critical time when each of the states should begin, and instructs each of the other controllers to begin any of the states at the associated determined critical time.

10 Claims, 5 Drawing Sheets

GLASS CONTAINER FORMING MACHINE WITH A CONTROLLER FOR CONTROLLING CONTROLLERS

This application is a continuation of Ser. No. 07/992,717, filed Dec. 18, 1992, now abandoned.

The present invention relates to machines which form glass containers from discrete gobs of molten glass.

One such machine is referred to as an I.S. (individual section) machine which has a plurality of identical sections each having a number of mechanisms (takeout, invert, plungers, pusher etc.). The operation of the machine is carried out by operating motion actuators which can be profiled as in the case of servo motors or non-profiled as in the case of a simple pneumatic cylinder and by operating regulators such as valves which distribute high and low pressure air to supply process air, electric devices and analog or digital signals. The operation of these actuators and regulators is controlled by a controller which has a repetitive sequencing device.

It is an object of the present invention to provide an improved control for controlling the operation of a machine for forming glass containers.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

Referring to the drawings:

As shown in FIG. 1, an individual section of an I.S. machine has a number of mechanisms, each of which has one or more structures which are displaced by a profiled motion actuator (stepper, electric servo, hydraulic servo, pneumatic servo, etc.) during each cycle of the section. Where the machine (for purposes herein a section will be treated as a machine) is operating in the press and blow configuration, for example, plungers (one or more) will be raised into gobs of molten glass contained within a blank mold to force the gobs to fill the molds and to simultaneously define an initial dimple in the gobs. This may be done with a single motion actuator or with a motion actuator for each plunger. An invert will take the thereby formed parisons from the blank mold to a blow mold where they will be blown into the final containers and a takeout will remove the containers from the blow mold and deposit them on a dead plate. A pusher has advancable fingers which are supported on a plate which can be rotated through an angle to displace containers from the dead plate to a moving conveyor. Each of these movements can be carried out by a profiled motion actuator which is controlled by a controller.

Figure 2:
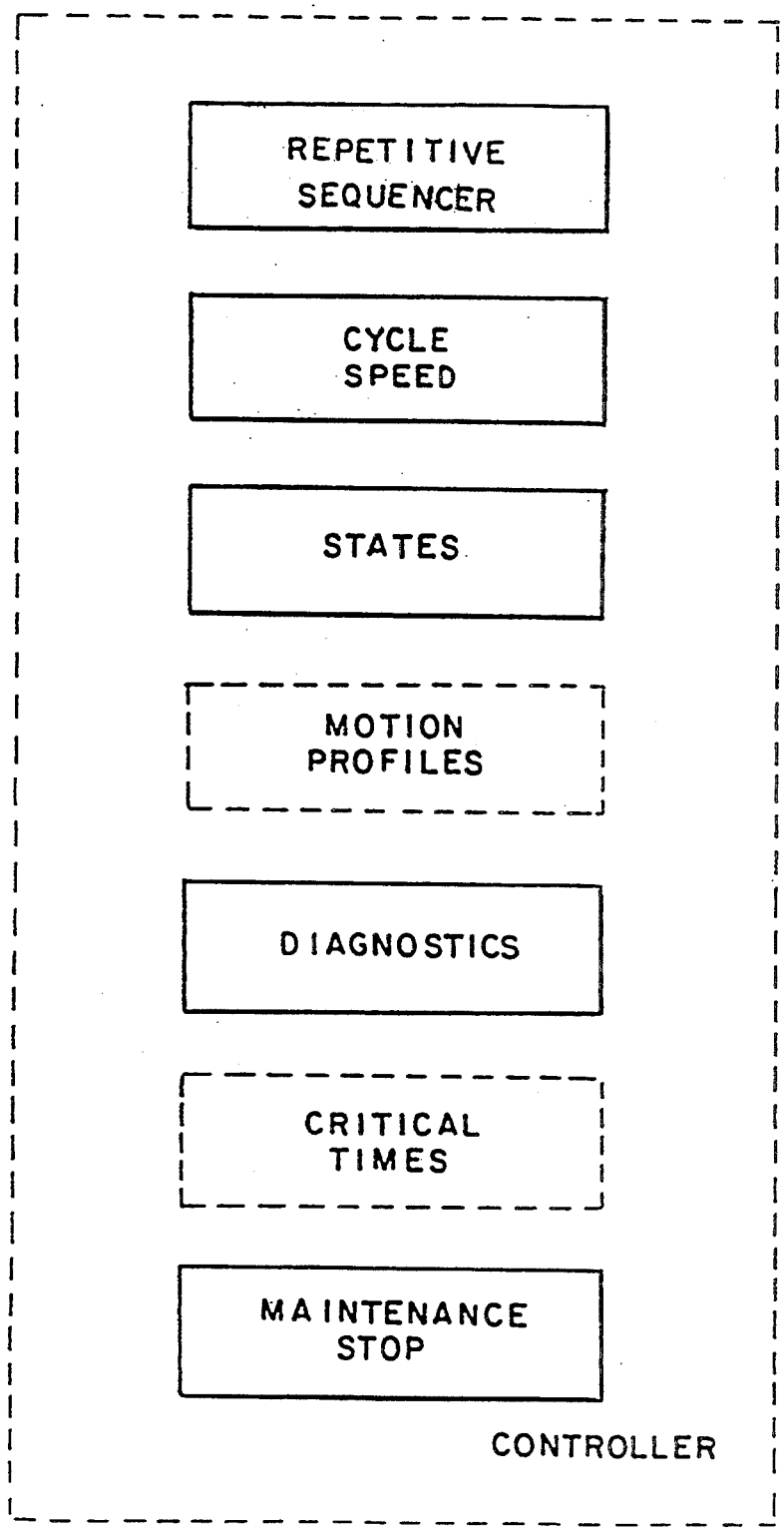
FIG. 2 is a schematic representation illustrating the controllers shown in FIG. 1.

High pressure and low pressure air is utilized in a variety of ways in the section. For example, air is used to cool the molds and to cool the ware over the dead plate. These air lines are controlled by regulators such as valves (non-profiled actuators such as solenoid valves) which may be operated by an associated controller. Such valves can also control non-profiled actuators like pneumatic cylinders. Other regulators can also be controlled. For example, a regulator could be an electric device or analog or digital signals. For convenience, the operated profiled motion actuators and the regulators (a non-profiled actuator such as a solenoid valve, for example) will collectively be referred to as peripherals (auxiliary devices). A plurality of controllers are used with one controller controlling all of these controllers. All controllers (FIG. 2) have a repetitive sequencer which controls the time in a section cycle in degrees or milliseconds when actions are to occur, a cycle speed algorithm for determining the speed and adjusting the phase of the repetitive sequencer, a library of machine states in which the controlled mechanisms can be operated (a state, for example, could be, normal stop which would bring all motion actuators to a halt after glass has been removed from the section, normal running, cold molds/cold blanks which would mean that specific motion actuators would operate at different angles than for normal operations (angles that could be forwarded to the controllers) by the controller which is in control of all the controllers, or any of the other well known machine states), diagnostics for identifying malfunctions, etc., and a maintenance stop which when initiated by any controller will prevent displacement of all the controlled displaceable structures of the entire section by disengaging the motive force. (Watchdog timer logic can be used to remove power to the outputs).

Figure 1:
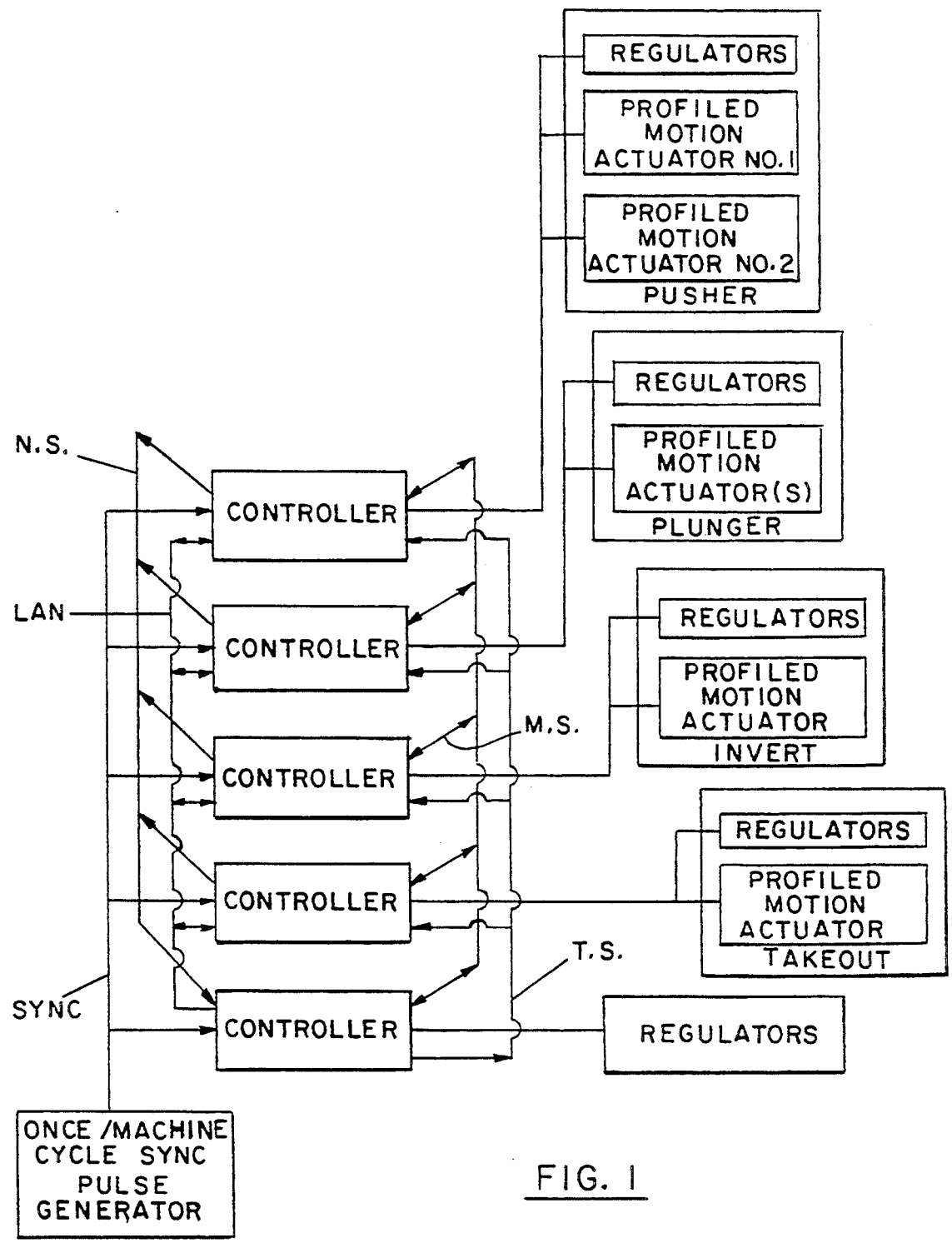
FIG. 1 is a schematic representation illustrating the control of an individual section of an I.S. machine made in accordance with the teachings of the present invention.

A controller may control the displacement of one or more profiled motion actuators, and may have a library of selectable motion profiles for each profiled motion actuator (or can define such based on provided parameters). As shown in FIG. 1, the controllers for the invert and takeout control one profiled motion actuator, whereas the controller for the pusher controls two profiled motion actuators. The controller may also just control the operation of regulators. The controller in the preferred embodiment which controls all the controllers is the controller that is only controlling regulators. This controller can also determine critical times which are the times when it is best to shift to given states. Not every controller has to operate differently in each state. For example, the pusher can operate the same for normal operation and for cold molds/cold blanks. Accordingly, when this controller advises all the controllers to shift to the cold molds/cold blanks mode the controller for the pusher will know that these two states for the pusher are the same and will continue to operate unchanged.

Figure 3:
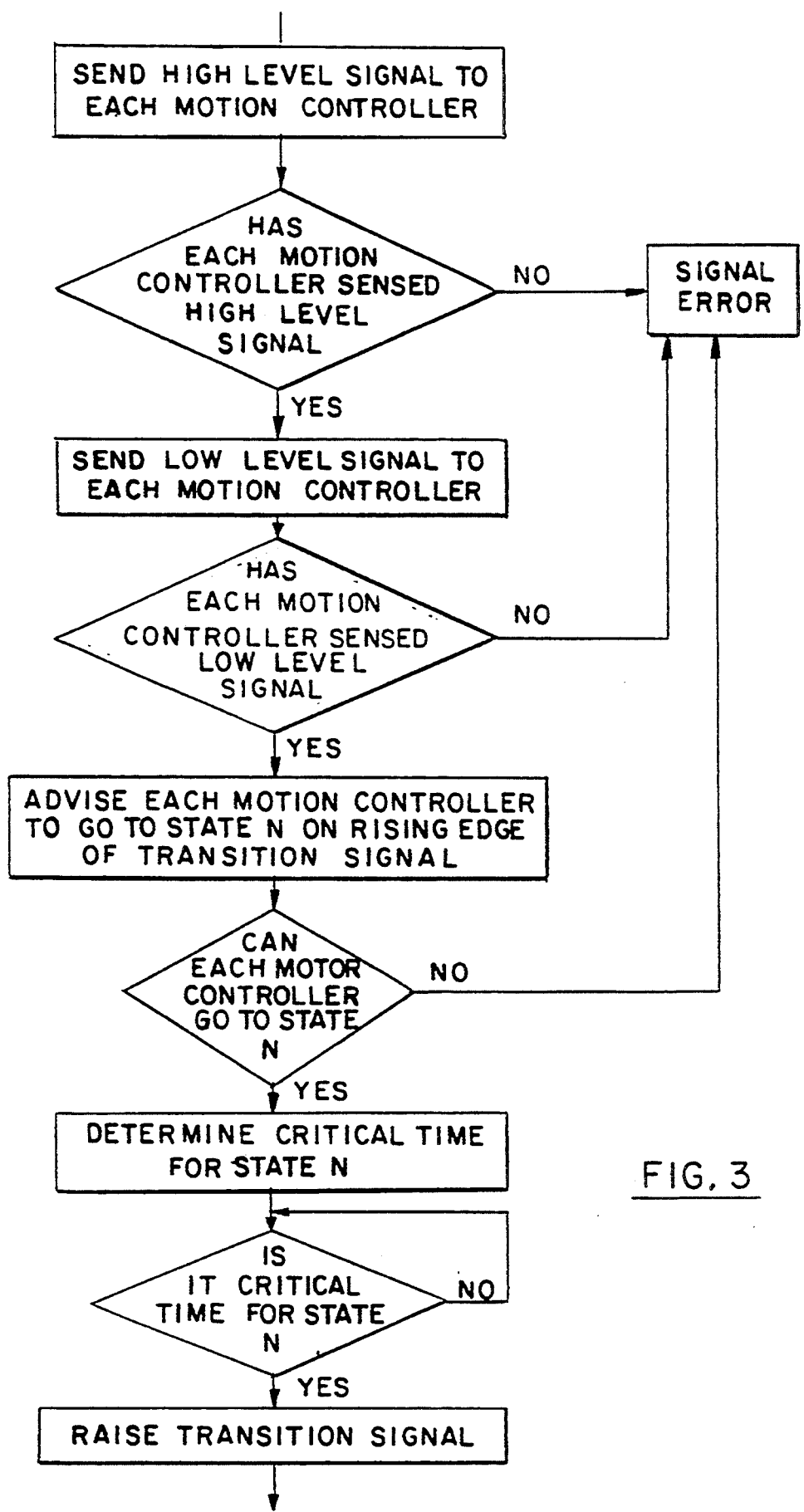
FIG. 3 is a logic diagram illustrating the operation of the section controller shown in FIG. 1.
Figure 4A:
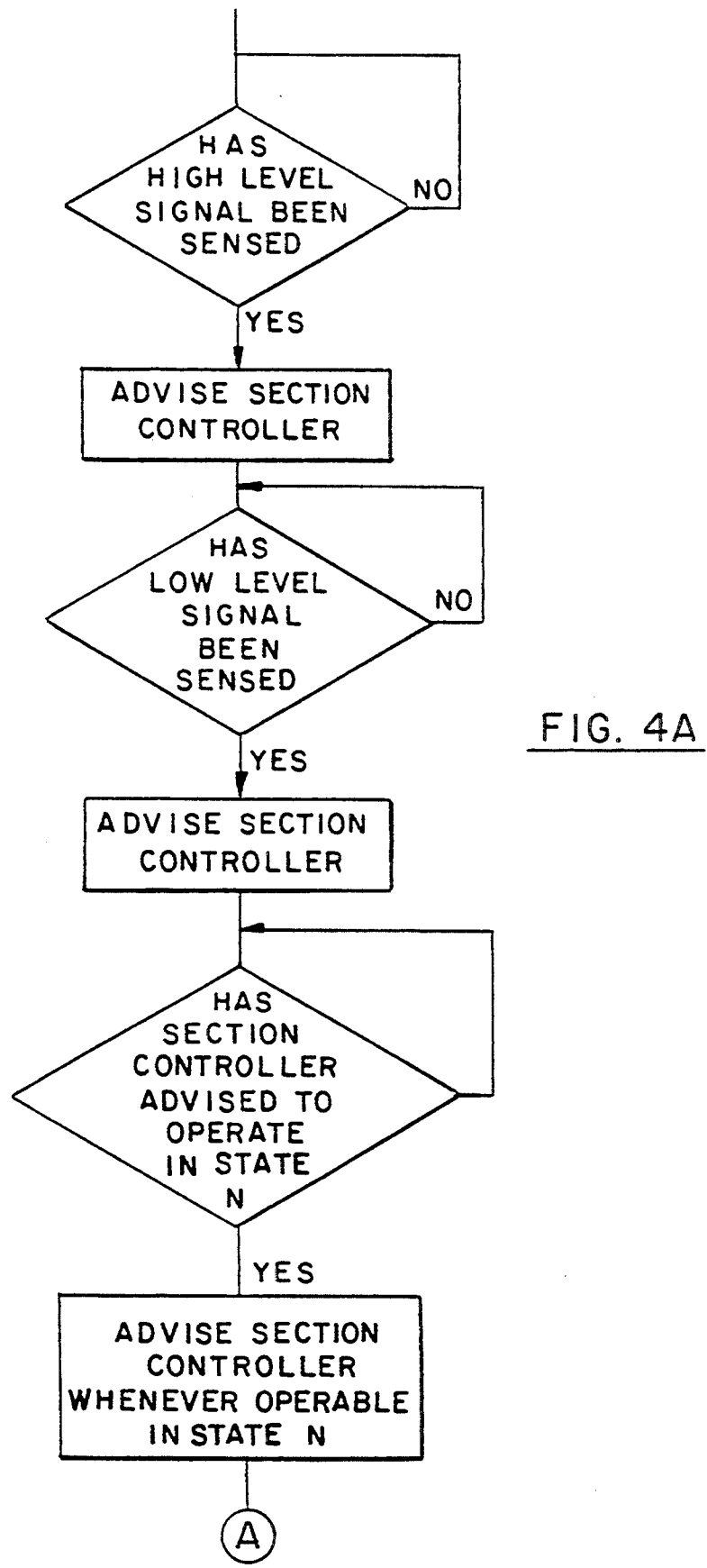
FIGS. 4A and 4B show a logic diagram illustrating the operation of a motion controller shown in FIG. 1.
Figure 4B:
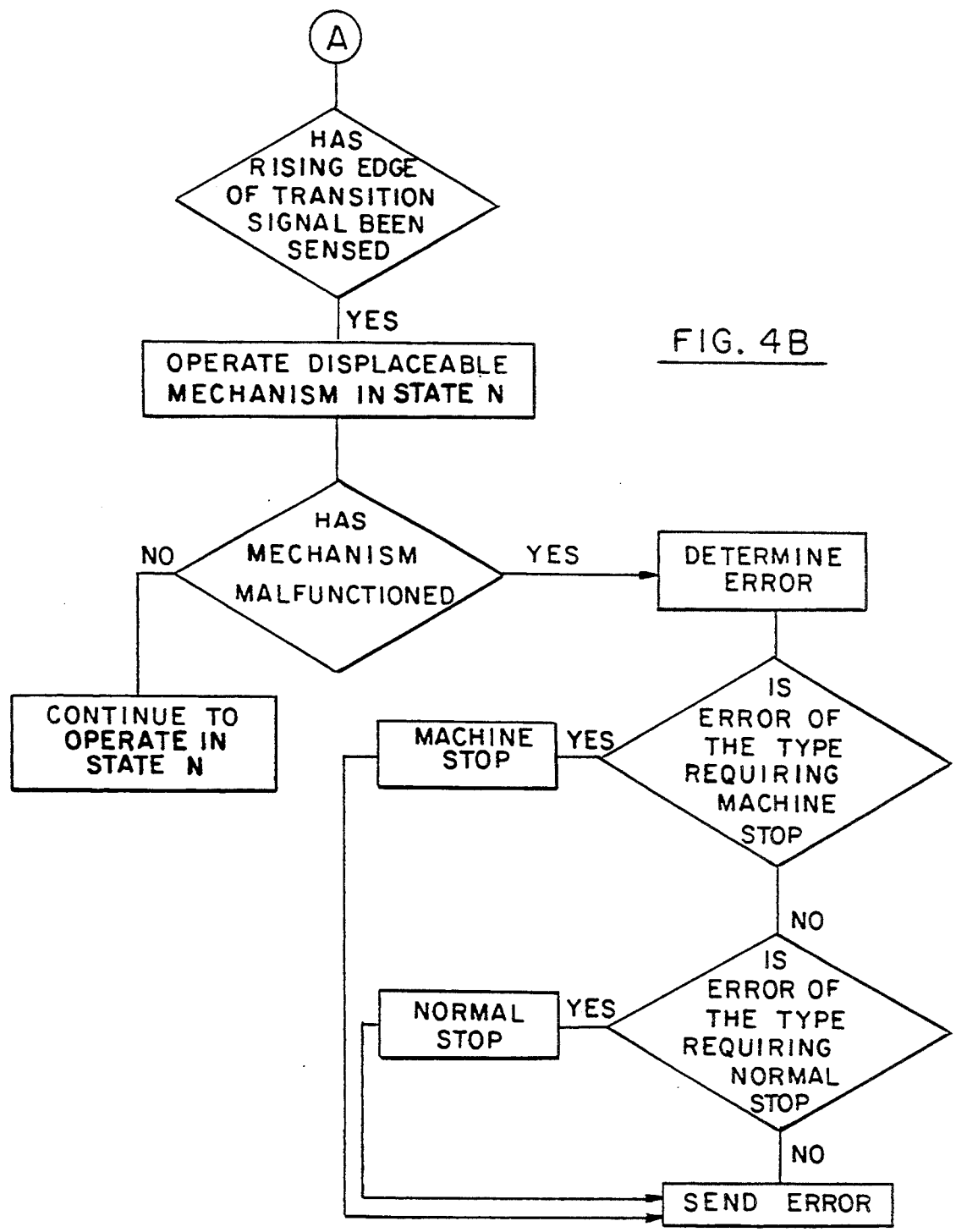

The controllers are synchronized with a sync signal issued by the once/machine cycle pulse generator and distributed on the sync signal line. Before the controllers can operate in a selected state the controller that controls all the controllers will verify that each controller is operational (FIG. 3) by first sending a high level signal on a parallel distribution transition signal line (T.S.) to each controller. The controller that is in control of all the controllers inquires via the local area network (LAN) whether this high level signal was sensed by each motion controller. When the controller diagnostics (FIG. 4) determine that a high level signal has been sensed it advises the controller in control via the LAN network and the procedure is repeated with a low level signal. The controller in control will then advise (instruct) each controller to go into (begin oepration in) a selected state (N) on the rising edge of a transition signal which will be distributed on the transition signal line (T.S.). If a controller is in maintenance stop or for any other reason can not go into that state the diagnostics will advise the controller in control accordingly. If it is possible for the controller to go to state N it will so inform the controller in control which can then, if it has received the same information from all the controllers, raise the transition signal. When the critical time is reached the controller in control raises the transition signal to the controllers and the controller in control and all the other controllers begin operating in the instructed state.

The controller diagnostics will also determine when some action in the cycle of operation of that controller has not occurred, etc. For example, referring again to FIG. 4, each controller not only can displace its associated structures but it has diagnostics which can determine whether the mechanism has malfunctioned and, if so, whether the malfunction is the type of malfunction requiring an immediate maintenance stop or only requiring that the machine be brought to a normal stop. Where the error does not require either stop it can be signalled to the operator for corrective action. As can be seen from FIG. 1, the maintenance stop line (M.S.) is drawn as a bi-directional circuit interconnecting all the controllers. This conveys the fact that a maintenance stop for the entire section can be instituted by any controller. When a controller has determined that the section should come to a normal stop it can communicate via a one-way normal stop line (N.S.) to the controller in control. Basic two-way communication between the controllers is, as has already been discussed, carried out on the local area network (LAN). While a single control controls all the controllers in the preferred embodiment, it would be possible for this responsibility to be shared with other controllers so long as at any given time only one controller is in charge of all the controllers.

What is claimed is:

1. A machine for forming glass containers comprising
a plurality of peripherals, and
a plurality of controllers each controlling at least one of said peripherals, each of said controllers including
a library of machine states in which controlled peripherals can be operated, and
means for operating in a machine state selected from said library,
one of said controllers additionally including
means for selecting the machine state of said library which is to operate in each of the other controllers, and
means for advising each of said other controllers that operation is going to be switched from one machine state in said library to a second machine state in said library, and
each of said other controllers further including means, responsive to said advising means, for informing said one controller whether or not operation can be shifted from said one machine state to said second machine state.

2. A machine for forming glass containers according to claim 1, wherein each of said other controllers further comprise means for determining that operation should be switched from a machine state in said library to a third machine state in said library and means for instructing said one controller to select said third machine state in said library to operate in each of said other controllers.

3. A machine for forming glass containers according to claim 1, further comprising means for synchronizing said plurality of controllers.

4. A machine for forming glass containers according to claim 1, wherein said library includes a maintenance stop state, and further comprising means actuatable by each of said plurality of controllers for switching the state of each of said plurality of controllers to said maintenance stop state.

5. A machine for forming glass containers according to claim 1,
wherein said one controller comprises means for sequentially delivering high and low test signals to each of said other controllers and wherein
each of said other controllers further comprises
means for determining that said high and low test signals have been received, and
means for directing signals acknowledging sequential receipt of said high and low test signals to said one controller so that said one controller will know that each of said other controllers is operational.

6. An individual section of an I.S. machine for forming glass containers comprising
a plurality of peripherals, and
a plurality of controllers each controlling at least one of said peripherals, each of said controllers including
a library of machine states in which controlled peripherals can be operated, and
means for operating in a machine state selected from said library,
one of said controllers additionally including
means for selecting the machine state of said library which is to operate in each of the other controllers, and
means for advising each of said other controllers that operation is going to be switched from one machine state in said library to a second machine state in said library, and
each of said other controllers further including means, responsive to said advising means, for informing said one controller whether or not operation can be shifted from said one machine state to said second machine state.

7. An individual section of an I.S. machine for forming glass containers according to claim 6, wherein each of said other controllers further comprise means for determining that operation should be switched from a machine state in said library to a third machine state in said library and means for instructing said one controller to select said third machine state in said library to operate in each of said other controllers.

8. An individual section of an I.S. machine for forming glass containers according to claim 6, further comprising means for synchronizing said plurality of controllers.

9. An individual section of an I.S. machine for forming glass containers according to claim 6, wherein said library includes a maintenance stop state, and further comprising means actuatable by each of said plurality of controllers for switching the state of each of said plurality of controllers to said maintenance stop state.

10. An individual section of an I.S. machine for forming glass containers according to claim 6,
wherein said one controller comprises means for sequentially delivering high and low test signals to each of said other controllers and wherein each of said other controllers further comprises
means for determining that said high and low test signals have been received, and
means for directing signals acknowledging sequential receipt of said high and low test signals to said one controller so that said one controller will know that each of said other controllers is operational.

* * * * *